US010313189B2

United States Patent
Kaivosoja et al.

(10) Patent No.: US 10,313,189 B2
(45) Date of Patent: Jun. 4, 2019

(54) NETWORK ELEMENT AND A CONTROLLER FOR MANAGING THE NETWORK ELEMENT

(71) Applicants: Vesa Kaivosoja, Espoo (FI); Juha-Petteri Nieminen, Espoo (FI)

(72) Inventors: Vesa Kaivosoja, Espoo (FI); Juha-Petteri Nieminen, Espoo (FI)

(73) Assignee: CORIANT OY, Espoo (FI)

( * ) Notice: Subject to any disclaimer, the term of this patent is extended or adjusted under 35 U.S.C. 154(b) by 176 days.

(21) Appl. No.: 14/554,506

(22) Filed: Nov. 26, 2014

(65) Prior Publication Data
US 2015/0146570 A1 May 28, 2015

(30) Foreign Application Priority Data

Nov. 27, 2013 (FI) .................................... 20136189

(51) Int. Cl.
*G06F 16/24* (2019.01)
*H04L 12/24* (2006.01)

(52) U.S. Cl.
CPC .......... *H04L 41/0853* (2013.01); *G06F 16/24* (2019.01); *H04L 41/0806* (2013.01); *H04L 41/0869* (2013.01)

(58) Field of Classification Search
CPC ....................... H04L 41/0853; G06F 17/30386
USPC ....................................................... 370/254
See application file for complete search history.

(56) References Cited

U.S. PATENT DOCUMENTS

| 6,128,656 | A | 10/2000 | Matchefts et al. |
| 8,375,224 | B2* | 2/2013 | Youn .................. G06F 21/6218 713/193 |
| 2003/0018889 | A1 | 1/2003 | Burnett et al. |
| 2007/0268516 | A1* | 11/2007 | Bugwadia ............... H04L 67/34 358/1.15 |
| 2012/0331016 | A1* | 12/2012 | Janson ............. G06F 17/30557 707/809 |
| 2013/0039214 | A1* | 2/2013 | Yedavalli .............. H04L 45/025 370/254 |
| 2013/0117428 | A1 | 5/2013 | Koponent et al. |
| 2013/0246639 | A1* | 9/2013 | Nedbal ................. H04L 63/101 709/228 |

(Continued)

OTHER PUBLICATIONS

Schaum's Outline of Theory and Problems of Computer Architecture, The McGraw-Hill Companies Inc., Indian Special Edition 2009 (Year: 2009).*

(Continued)

*Primary Examiner* — Peter G Solinsky
(74) *Attorney, Agent, or Firm* — Young & Thompson

(57) ABSTRACT

A software-defined network includes a database (105) that is accessible to a controller system (108, 109) of the software defined network and also to network elements (101-014) of the software defined network. The controller system determines configuration data and delivers it to the database. Each network element retrieves its part of the configuration data from the database and implements the retrieved part of the configuration data into its own configuration system that enables the network element to operate as a part of the software-defined network. The commonly used database facilitates maintaining the congruence between the network elements and the controller system of the software-defined network.

21 Claims, 4 Drawing Sheets

(56) References Cited

U.S. PATENT DOCUMENTS

| | | | |
|---|---|---|---|
| 2013/0250037 A1* | 9/2013 | Cipolli | H04N 7/152 348/14.09 |
| 2013/0262399 A1* | 10/2013 | Eker | G06F 17/30371 707/687 |
| 2013/0329548 A1* | 12/2013 | Nakil | H04L 41/0668 370/228 |
| 2013/0332399 A1* | 12/2013 | Reddy | G06N 99/005 706/12 |
| 2013/0332577 A1* | 12/2013 | Nakil | H04L 41/0668 709/219 |
| 2014/0053226 A1* | 2/2014 | Fadida | H04L 67/34 726/1 |
| 2014/0112150 A1* | 4/2014 | Ko | H04L 47/24 370/236 |
| 2014/0129700 A1* | 5/2014 | Mehta | H04L 43/0817 709/224 |
| 2014/0223028 A1* | 8/2014 | Peng | H04L 67/10 709/246 |
| 2014/0280846 A1* | 9/2014 | Gourlay | H04L 41/0853 709/223 |
| 2015/0009804 A1* | 1/2015 | Koponen | H04L 41/0695 370/219 |
| 2015/0100704 A1* | 4/2015 | Davie | H04L 45/14 709/238 |
| 2016/0020946 A1* | 1/2016 | Morper | H04L 41/0806 709/222 |
| 2016/0050117 A1* | 2/2016 | Voellmy | H04L 12/6418 370/392 |
| 2016/0173338 A1* | 6/2016 | Wolting | H04L 41/145 709/223 |
| 2016/0212012 A1* | 7/2016 | Young | H04L 41/14 |
| 2016/0308785 A1* | 10/2016 | Padmanabhan | H04L 47/825 |

OTHER PUBLICATIONS

FI Search Report, dated Jul. 25, 2014, from corresponding FI application.

* cited by examiner

NETWORK ELEMENT AND A CONTROLLER FOR MANAGING THE NETWORK ELEMENT

FIELD OF THE INVENTION

The invention relates generally to software-defined networking. More particularly, the invention relates to a network element for a software-defined network "SDN" and to a controller for a software-defined network. Furthermore, the invention relates to a method for configuring network elements of a software defined network. Furthermore, the invention relates to a computer program for a network element of a software-defined network and to a computer program for a controller of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

In the following, the software-defined networking is illustrated in a simplified manner using the analogy to the postal service. For any given street location, the software-defined networking works so that all the letters from all the tenants would first be aggregated by a network element on an edge of a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements. Traditionally, the network elements are configured so that the controller sends to each network element configuration data with the aid of which the network element constructs a configuration system. The configuration system enables the network element to operate as a part of a software-defined network "SDN". The configuration system may comprise for example one or more look-up tables defining actions to be carried out in different operational situations. One of the challenges is related to the need to keep the databases of the controller and the databases of the network elements congruent in all situations because non-congruency would cause severe functional troubles within the software defined network.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new software-defined network "SDN" that comprises:
- a controller system for implementing the control plane of the software-defined network,
- network elements for implementing the data plane of the software-defined network, and
- a database that is accessible to the controller system and also to the network elements.

The controller system is adapted to determine, in accordance with the control plane of the software-defined network, configuration data and deliver the configuration data to the database, and each of the network elements is adapted to retrieve, from the database, a portion of the configuration data related to the network element and implement the retrieved portion of the configuration data into a configuration system of the network element, the configuration system enabling the network element under consideration to operate as a part of the software-defined network in accordance with the data plane of the software-defined network. Furthermore, the controller system is adapted to deliver, to the database, an ability indicator expressing one or more data formats suitable for the controller system so as to enable the network elements to get aware of the one or more data formats suitable for the controller system, and/or at least one of the network elements is adapted to deliver, to the database, another ability indicator expressing one or more data formats suitable for the network element so as to enable the controller system to get aware of the one or more data formats suitable for the network element.

The above-mentioned database that is commonly used by the controller system and the network elements facilitates maintaining the congruence between the network elements and the controller system in the software-defined network. In addition to the configuration data and the ability indicators, the database can be used for delivering other information between the network elements and between the controller system and the network elements. The other information may comprise for example messages related to negotiations between the network elements and/or between the controller system and the network elements.

In accordance with the invention, there is provided also a new method for configuring network elements of a software-defined network "SDN". A method according to the invention comprises:

maintaining a database that is accessible to a controller system of the software-defined network and also to the network elements of the software-defined network, writing, to the database, an ability indicator received from one of the network elements and expressing one or more data formats suitable for the one of the network elements so as to enable the controller system of the software-defined network to get aware of the one or more data formats, and writing, to the database, configuration data and at least updates of the configuration data received from the controller system via the software-defined network, the configuration data enabling the network elements to operate as parts of the software-defined network in accordance with the data plane of the software-defined network.

The method comprises the following action in response to receiving, from one of the network elements, a query specifying a part of the configuration data:

delivering, to the one of the network elements, configuration information expressing the specified part of the configuration data so as to enable the one of the network elements to update, in accordance with the control plane of the software-defined network, a configuration system enabling the one of the network elements to operate as a part of the software-defined network in accordance with the data plane of the software-defined network by implementing the configuration information at least partly into the configuration system enabling the one of the network elements to operate as the part of the software-defined network.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. A network element according to the invention comprises:

a data transfer interface for transmitting data to the software-defined network and for receiving data from the software-defined network, and a processing system for maintaining a configuration system enabling the network element to operate as a part of the software-defined network in accordance with the data plane of the software-defined network, and for operating the network element in accordance with the configuration system, the configuration system comprising a system of interconnected look-up tables defining actions to be carried out by the network element when operating as the part of the software-defined network.

The processing system of the network element is adapted to:

control the data transfer interface to transmit, to a part of the software-defined network maintaining a database accessible to many network elements of the software-defined network and storing configuration data related to the network elements of the software-defined network, an ability indicator to be written to the database and expressing one or more data formats suitable for the network element so as to enable a controller system of the software-defined network to get aware of the one or more data formats, control the data transfer interface to transmit a query to the part of the software-defined network, the query specifying a part of the configuration data and requesting to send, to the network element, configuration information expressing the specified part of the configuration data, and update the configuration system in accordance with the control plane of the software-defined network by implementing, in response to receiving the configuration information, the received configuration information at least partly into the configuration system while the network element is operating as the part of the software-defined network in accordance with the configuration system.

In accordance with the invention, there is provided also a new controller for configuring network elements of a software-defined network "SDN". The controller can be a part of a controller system constituted by many controllers of the software-defined network. It is also possible that the controller alone constitutes the controller system of the software-defined network. Furthermore, the controller can be a single apparatus or a combination of a plurality of apparatuses capable of communicating with each other. A controller according to the invention comprises:

a data transfer interface for transmitting data to the software-defined network and for receiving data from the software-defined network, and a processing system for determining and updating, in accordance with the control plane of the software-defined network, configuration data enabling the network elements to operate as parts of the software-defined network in accordance with the data plane of the software-defined network, for delivering, via the software-defined network, the configuration data and at least updates of the configuration data to be written to a database accessible to the network elements to be configured, and for delivering, via the software-defined network, an ability indicator to be written to the database and expressing one or more data formats suitable for the controller so as to enable the network elements to get aware of the one or more data formats.

In accordance with the invention, there is provided also a new computer program for a network element of a software-defined network. The computer program comprises computer executable instructions for controlling a programmable processing system of the network element to:

control a data transfer interface of the network element to transmit, to a part of the software-defined network maintaining a database accessible to many network elements of the software-defined network and storing configuration data related to the network elements of the software-defined network, an ability indicator to be written to the database and expressing one or more data formats suitable for the network element so as to enable a controller system of the software-defined network to get aware of the one or more data formats, control the data transfer interface of the network element to transmit a query to the part of the software-defined network, the query specifying a part of the configuration data and requesting to send, to the network element, configuration information expressing the specified part of the configuration data, and update a configuration system of the network element in accordance with a control plane of the software-defined network by implementing, in response to receiving the configuration information, the received configuration information at least partly into the configuration system while the network element is operating as a part of the software-defined network in accordance with the configuration system.

In accordance with the invention, there is provided also a new computer program for a controller of a software-defined network. The computer program comprises computer executable instructions for controlling a programmable processing system of the controller to deliver, to a database that is accessible to the controller and to network elements to be configured, configuration data for configuring the network elements to operate as parts of the software-defined network in accordance with the control plane of the software-defined network.

In accordance with the invention, there is provided also a new computer program product. The computer program product comprises a non-volatile computer readable medium, e.g. a compact disc "CD", encoded with a computer program according to the invention for a network element of a software-defined network and/or with a computer program according to the invention for a controller of the software-defined network.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
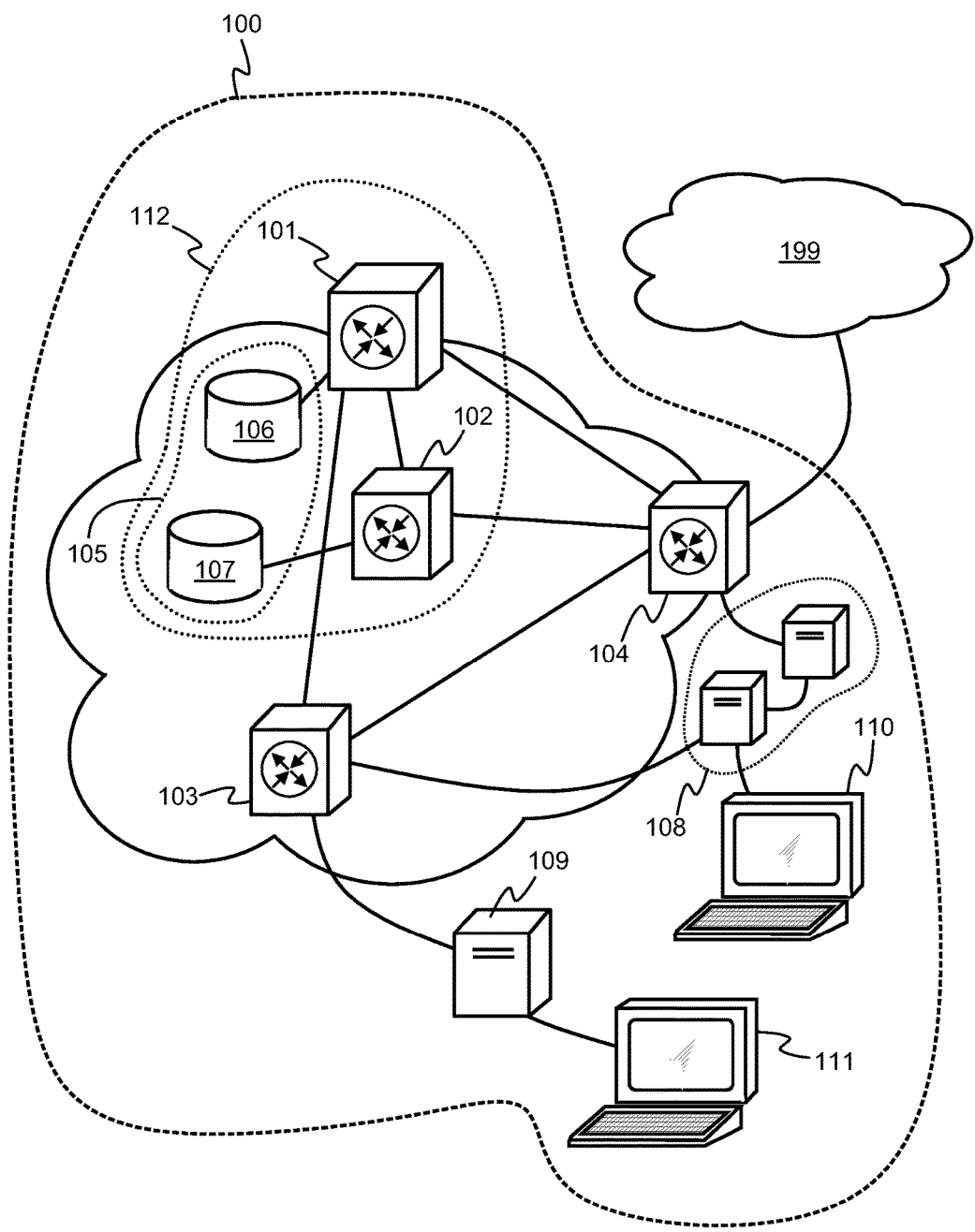
FIG. 1 shows a schematic illustration of a software-defined network comprising network elements according to an exemplifying embodiment of the invention and controllers according to an exemplifying embodiment of the invention.

FIG. 1 shows a schematic illustration of an exemplifying software-defined network "SDN" 100. The software-defined network comprises network elements 101, 102, 103, and 104. The software-defined network 100 further comprises controllers 108 and 109 that can be deemed to constitute a controller system of the software-defined network. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, each of the controllers 108 and 109 may consist of a single apparatus or a combination of a plurality of apparatuses. In the exemplifying case illustrated in FIG. 1, the controller 108 comprises two interconnected apparatuses. A user-interface device 110 is connected to the controller 108, and correspondingly a user-interface device 111 is connected to the controller 109. In the exemplifying case illustrated in FIG. 1, the network element 104 acts as a gateway to an external network 199 that can be e.g. the global Internet. It is to be noted that the controller 108 or one or more parts of it can also act as a network element that can be e.g. an Internet Protocol "IP" router, a multiprotocol label switching "MPLS" switch, a packet optical switch, and/or an Ethernet switch. Correspondingly, the controller 109 or one or more parts of it can also act as a network element of the kind mentioned above. The software-defined network 100 further comprises a database 105 that is accessible to the controllers 108 and 109 and also to the network elements 101-104. In the exemplifying software-defined network illustrated in FIG. 1, the database 105 is implemented with the aid of memory devices 106 and 107 which are communicatively connected to the network elements 101 and 102. Hence, the network elements 101 and 102 and the memory devices 106 and 107 constitute a part 112 of the software-defined network maintaining the database 105. It is also possible that a memory device or one or more of memory devices for implementing the database is directly connected to the controller 108 and/or to the controller 109. Hence, the part of the software-defined network for maintaining the database can be implemented in many different ways.

Without limiting the generality and merely for illustrative purposes, we consider the operation of the controller 108. The controller 109 may operate in the similar way, and/or the controller 109 may constitute a backup for the controller 108. The controller 108 is adapted to determine configuration data enabling one or more of the network elements to operate as parts of the software-defined network. Furthermore, the controller 108 is adapted to deliver the configuration data to be written to the database 105 which is accessible to the network elements of the software defined network. In the exemplifying case illustrated in FIG. 1, the controller delivers the configuration data to the database 105 so that the controller transmits the configuration data to the part 112 of the software-defined network. It is however also possible that the one or more memory devices for implementing the database are directly connected to the controller 108. In such a case, the forwarding mechanisms of the software-defined network are not needed for transferring the configuration data from the controller to the database.

The above-mentioned configuration data comprises portions related to the network elements to be configured. The network element-specific portions of the configuration data are not necessarily mutually non-overlapping since the configuration data may comprise data that is common to two or more of the network elements. A relevant portion of the configuration data related to one of the network elements enables the network element under consideration to construct a configuration system that enables the network element to manage data in a desired manner. The data to be managed by the network element can be in form of data frames such as for example Internet Protocol IP-packets, MPLS-labeled frames, Ethernet frames, or the data can be in some other form accordant with one or more data transfer protocols being used. The configuration system may comprise for example a system of interconnected look-up tables defining actions to be carried out in different operational situations. The look-up tables may include for example one or more successive flow tables and a group table. Each flow table contains a set of flow entries. Each flow entry may consist of match fields, counters, and a set of actions to apply to matching data frames. The group table contains group entries, where each group entry may contain a list of actions to be directed to data frames defined to belong to a particular group. An action defined by the configuration data may comprise for example: recording data into a memory, modifying the data, selecting one or more of egress ports of the network element and forwarding the data and its possible duplicates to the selected one or more egress ports, selecting one or more look-up tables of the configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data. The database 105 that is accessible to the controllers 108 and 109 and also to the network element makes it possible to configure the software defined network 100 without a need to run the OpenFlow or some other corresponding configuration protocol between the controllers and the network elements. More details about the above-mentioned OpenFlow can be found from "OpenFlow Switch Specification" managed by the Open Networking Foundation "ONF".

Without limiting generality and merely for illustrative purposes, the operation of the network element 103 is considered in the following. The network element 103 comprises software and/or hardware means for retrieving configuration information from the database 105 and software and/or hardware means for constructing, in accordance with the retrieved configuration information, the configuration system enabling the network element 103 to operate as a part of the software-defined network 100. The configuration information represents a relevant part of the configuration data stored by the database 105. In the exemplifying case illustrated in FIG. 1, the network element 103 retrieves the configuration information so that the network element transmits a query to the part 112 of the software-defined network maintaining the database 105. The query specifies the relevant part of the configuration data and requests to send, to the network element 103, the configuration information expressing the specified part of the configuration data. The query can be transmitted by the network element for example in response to receiving, at the network device, a notice of change of the configuration data. In this case, the received notice of change acts as a trigger for downloading the relevant part of the configuration data from the database 105. In order to maintain and ensure consistency between the database 105 and the network element 103, the network element 103 can be adapted to transmit periodically update requests to the part 112 of the software-defined network, where each update request requests to send at least the changes of the part of the configuration data related to the network element 103. Instead of receiving the above-mentioned notice of change and transmitting the above-mentioned query in response to the reception of the notice of change, the periodically transmitted update requests may be the only queries for configuration data. In this exemplifying case, the network element 103 and the database 105 are kept congruent by polling.

In a software-defined network according to an exemplifying embodiment of the invention, at least one of the network elements 101-104 is adapted to check whether the configuration information retrieved from the database 105 is suitable for the network element under consideration. In a case where the configuration information is suitable for the network element, the network element implements the configuration information into the configuration system of the network element and transmits an acceptance notification to be written to the database 105. In a case where the configuration information is unsuitable for the network element, the network element transmits a refusal notification to be written to the database. The acceptance or refusal notification written to the database 105 enables the controller 108 and/or the controller 109 to get aware of whether or not the configuration information has been implemented into the configuration system of the network element. In the exemplifying case illustrated in FIG. 1, the controller retrieves the acceptance or refusal notification so that the controller transmits, to the part 112 of the software-defined network, a query specifying the data to be retrieved and requesting to send the specified data to the controller. As mentioned earlier, it is also possible that the one or more memory devices for implementing the database are directly connected to the controller. In such a case, the forwarding mechanisms of the software-defined network are not needed for transferring the acceptance or refusal notification from the database to the controller.

In a software-defined network according to an exemplifying embodiment of the invention, at least one of the network elements 101-104 is adapted to check whether the configuration information retrieved from the database 105 comprises a portion suitable for the network element, and whether the configuration information comprises an unsuitable portion. In a case where the configuration information comprises a suitable portion, the network element implements the suitable portion into the configuration system and transmits to the database an acceptance notification identifying the suitable portion. In this exemplifying case, the acceptance notification enables the controller 108 and/or the controller 109 to know which portion of the configuration information has been implemented into the configuration system of the network element. It is also possible that the configuration information relates to a transaction that comprises a set of changes to be made to the configuration system of the network element so that the each change is valid to be implemented into the configuration system only after all the changes of the set have been checked to be suitable for the network element and so that, if any of the changes turns out to be unsuitable, the whole set of changes is deemed to be unsuitable. In this exemplifying case, the network element checks whether the configuration information is suitable for the network element together with other configuration information received earlier, i.e. the network element checks whether the configuration information completes the set of changes to be made. In a case where the configuration information completes the set of changes, the network element implements the set of changes, i.e. the configuration information and the earlier received configuration information, into the configuration system and transmits to the database 105 an acceptance notification expressing that the set of changes has been implemented into the configuration system of the network element. In this exemplifying case, the acceptance notification enables the controller 108 and/or the controller 109 to get aware of the implementation of the set of changes into the configuration system of the network element.

In a software-defined network according to an exemplifying embodiment of the invention, at least one of the network elements 101-104 is adapted to transmit, to the part 112 of the software-defined network, a network element-specific ability indicator to be written to the database 105. The network element-specific ability indicator expresses one or more data formats suitable for the network element under consideration so as to enable the controller 108 and/or the controller 109 to get aware of the one or more data formats suitable for the network element. Each of the controllers 108 and 109 can be adapted to transmit, to the part 112 of the software-defined network, a controller-specific ability indicator to be written to the database 105. The controller-specific ability indicator expresses one or more data formats suitable for the controller under consideration so as to enable the network elements to get aware of the one or more data formats suitable for the controller. Hence, the database 105 can be used for negotiating about data formats that are suitable for the network elements and/or about data formats that are suitable for the controllers.

In a software-defined network according to an exemplifying embodiment of the invention, at least one of the network elements 101-104 is adapted to transmit, to the part 112 of the software-defined network, status data related to the network element under consideration and to be written to the database 105. The status data may express for example the measured loading or other statistical data related to the network element, amount of free buffer memory in the network element, availabilities and data transfer capacities of data transfer links connected to the network element, data transfer capacities of ingress and/or egress ports of the network element, etc. Each of the controllers 108 and 109 can be adapted to retrieve, from the database, the status data delivered to the database 105 by one or more of the network elements. The controller can be adapted to check whether the retrieved status data expresses suitability of the concerned network element for operating as a part of the software defined network. In a case where the controller deems the network element to be suitable for operating as a part of the software-defined network, the controller can deliver an acceptance notification to be written to the database, whereas in a case where the controller deems the network element to be unsuitable for operating as a part of the software-defined network, the controller can deliver a refusal notification to be written to the database. The controller can be adapted to make the refusal notification to specify a reason why the controller deems the network element unsuitable so as to make the network element aware of the reason for the unsuitability. In some cases, the network element can be able to correct the situation. An exemplifying situation can be for example such that a transmission rate from the network element to a neighboring network element is too high for the neighboring network element. In this case, the network element may correct the situation by setting its shaper to limit the transmission rate down to an allowable level.

In a software-defined network according to an exemplifying embodiment of the invention, at least one of the controllers 108 and 109 is adapted to deliver, to the database 105, a portion of data including the configuration data in a data format supported by the controller and by such ones of the network elements using this portion of the data, and to deliver another portion of the data in another data format different from the first mentioned data format and supported at least by the controller but not necessarily by any of the network elements. Furthermore, it is also possible that at least one of the network elements is adapted to deliver, to the database 105, data in a data format supported by the controller and by such ones of the network elements using the data and other data in another, different data format supported at least by the network element under consideration but not necessarily by the controller and/or the other network elements. Hence, some portions of the database can be according to one or more pre-determined data formats whereas some other portions can be a free-format portions. One or more of the network elements of the software-defined network 100 may comprise functional entities, such as e.g. software and/or hardware modules, so that each functional entity may have its own configuration data portion. In this case, the configuration data related to the network element under consideration may comprise a first part that relates to the whole network element, a second part which is common to all of the functional entities, one or more third parts each being specific to only one of the functional entities, and one or more fourth part each being common to two or more of the functional entities. The relevant portions of the configuration data enable each functional entity to construct an entity-specific configuration system that enables the functional entity to manage data in a desired manner. The database 105 can be arranged to be accessible to the functional entities so that each of the functional entities is capable of retrieving data related to the functional entity under consideration from the database. Furthermore, each of the functional entities can be arranged to be capable of transmitting data to be written to the database 105. An arrangement of the kind described above where each functional entity can communicate with the database facilitates providing a modular software and/or hardware architecture in the network element under consideration.

Figure 2:
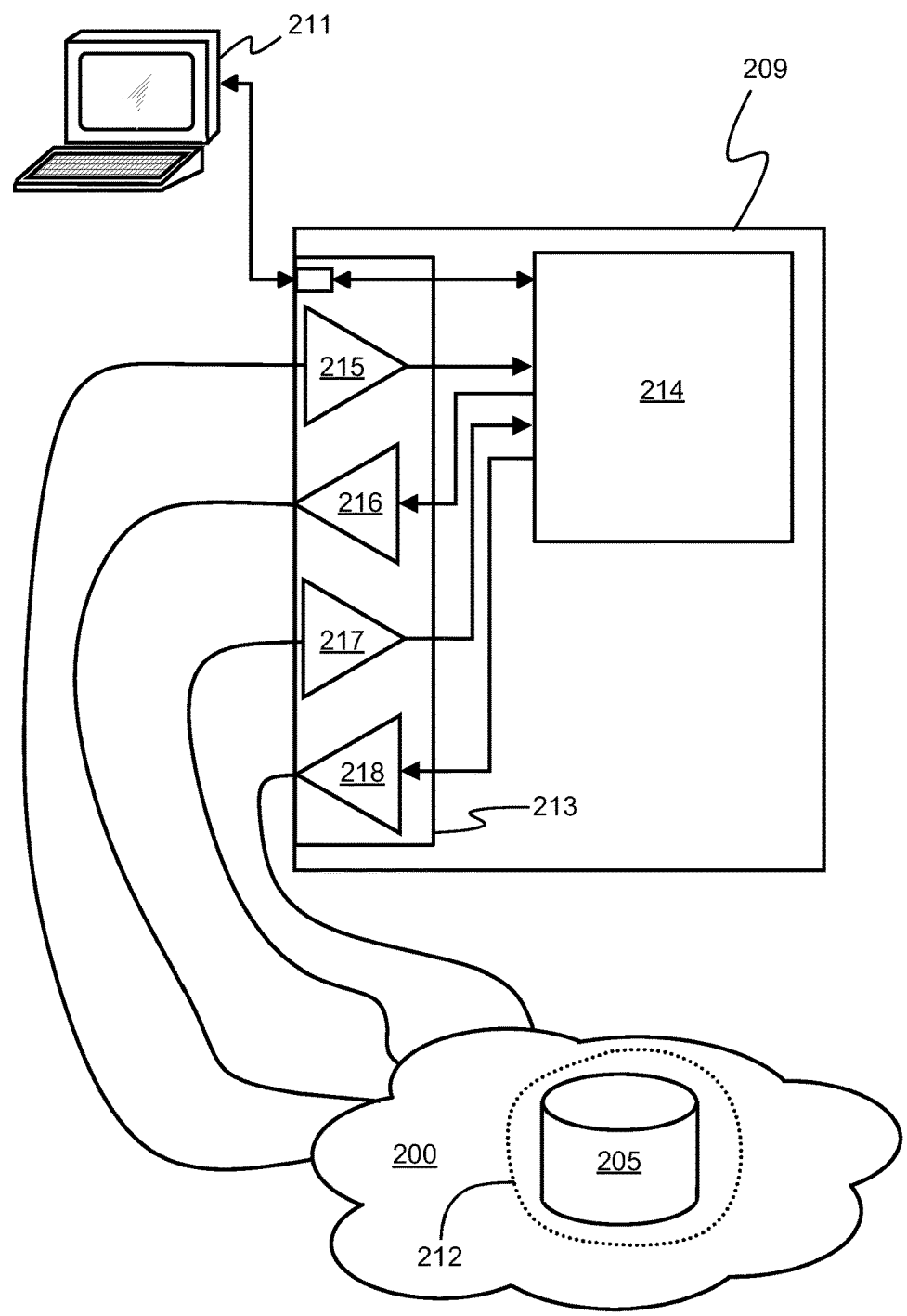
FIG. 2 shows a schematic illustration of a controller according to an exemplifying embodiment of the invention for configuring network elements of a software-defined network.

FIG. 2 shows a schematic illustration of a controller 209 according to an exemplifying embodiment of the invention for configuring network elements of a software-defined network. The network elements to be configured are not shown in FIG. 2. In the exemplifying case illustrated in FIG. 2, the controller is a single apparatus but, as mentioned earlier in this document, the controller could as well be a combination of a plurality of apparatuses. The controller comprises a data transfer interface 213 for receiving data and for transmitting data. The data transfer interface 213 comprises ingress ports 215 and 217 and egress ports 216 and 218 for connecting via data transfer links to other elements of the software-defined network. In FIG. 2, the elements of the software-defined network other than the controller 209 are depicted with a cloud 200. The data transfer interface 213 may further comprise one or more data ports for connecting to a user interface device 211 and/or to other peripheral devices. The controller 209 comprises a processing system 214 for determining configuration data enabling each of the network elements to construct a configuration system so as to enable the network element under consideration to operate as a part of the software-defined network. The processing system is adapted to deliver the configuration data to be written to a database 205 that is accessible to the network elements to be configured. In a controller according to an exemplifying embodiment of the invention, the processing system 214 is adapted to deliver, to the database 205, a portion of the configuration data related to one of the network elements in response to situation in which the network element under consideration has delivered a query for configuration data to the database 205. Hence, the network element may subscribe the configuration data by transmitting the query, and the controller may publish the relevant portion of the configuration data to the network element by delivering the relevant portion of the configuration data to the database. It is also possible that the above-mentioned query is transferred from the network element to the controller without delivering the query to the database.

In the exemplifying case illustrated in FIG. 2, the processing system 214 is adapted to control the data transfer interface 213 to transmit the configuration data to a part 212 of the software-defined network maintaining the database 205 so as to deliver the configuration data to the database. Furthermore, the processing system 214 is adapted to control, in response to a need to retrieve data from the database 205, the data transfer interface 213 to transmit, to the part 212 of the software-defined network, a retrieval query specifying the data to be retrieved and requesting to send the specified data to the controller. It is, however, also possible that one or more memory devices for implementing the database are directly connected to the controller. In such a case, the forwarding mechanisms of the software-defined network are not needed for transferring the configuration data from the controller to the database and neither for transferring data from the database to the controller.

In a controller according to an exemplifying embodiment of the invention, the processing system 214 is adapted to deliver, to the database, an ability indicator expressing one or more data formats suitable for the controller so as to enable the network elements to get aware of the one or more data formats.

In a controller according to an exemplifying embodiment of the invention, the processing system 214 is adapted to retrieve, from the database, status data delivered to the database by one or more of the network elements. The processing system 214 can be further adapted to:
- check whether the status data expresses suitability of the one or more of the network elements for operating as a part of the software defined network,
- deliver, in response to suitability of the one or more of the network elements, an acceptance notification to the database, and
- control, in response to unsuitability of the one or more of the network elements, a refusal notification to the database.

In a controller according to an exemplifying embodiment of the invention, the processing system 214 is adapted to deliver, to the database, a query which requests one or more of the network elements to deliver their status data to the database. Hence, the controller may subscribe the status data by transmitting the query and the one or more network elements may publish their status data to the controller by delivering their status data to the database. It is also possible that the above-mentioned query is transferred from the controller to the one or more network elements without delivering the query to the database 205.

In a controller according to an exemplifying embodiment of the invention, the processing system 214 is adapted to deliver, to the database, a first portion of data including the configuration data in a first data format supported by the controller and by such ones of the network elements using the first portion of the data and a second portion of the data in a second data format different from the first data format and supported at least by the controller.

The processing system 214 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
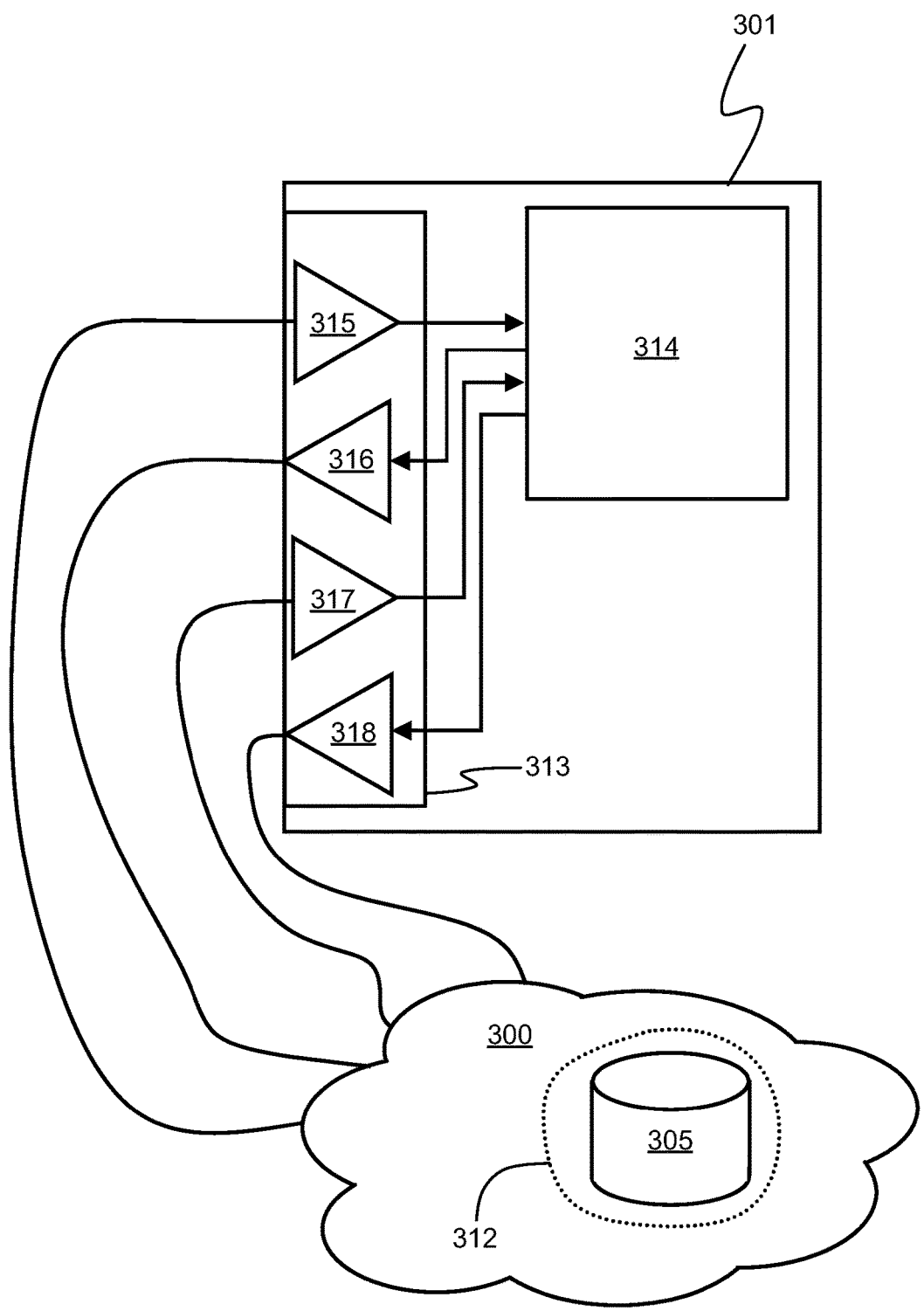
FIG. 3 shows a schematic illustration of a network element according to an exemplifying embodiment of the invention.

FIG. 3 shows a schematic illustration of a network element 301 according to an exemplifying embodiment of the invention for a software-defined network. The network element can be, for example, an Internet Protocol "IP" router, a Multiprotocol label switching "MPLS" switch, a packet optical switch, and/or an Ethernet switch. The network element comprises a data transfer interface 313 for receiving data and for transmitting data. The data transfer interface 313 comprises ingress ports 315 and 317 and egress ports 316 and 318 for connecting via data transfer links to other elements of the software-defined network. In FIG. 3, the elements of the software-defined network other than the network element 301 are depicted with a cloud 300. The network element comprises a processing system 314 for maintaining a configuration system enabling the network element to operate as a part of the software-defined network, and for operating the network element in accordance with the configuration system. The configuration system may comprise for example one or more look-up tables defining actions to be executed in conjunction with managing data to be forwarded by the network element. The processing system 314 is adapted to control the data transfer interface 313 to transmit a query to a part 312 of the software-defined network maintaining a database 305 that stores configuration data related to many network elements of the software defined network. The query specifies a part of the configuration data and requests to send, to the network element, configuration information expressing the specified part of the configuration data: The processing system 314 is capable of implementing, in response to receiving the above-mentioned configuration information, the received configuration information at least partly into the configuration system of the network element.

In a network element according to an exemplifying embodiment of the invention, the processing system 314 is adapted to control the data transfer interface 313 to transmit the query in response to receiving, from the part 312 of the software-defined network, a notice of change of the configuration data. The received notice of change acts as a trigger for downloading the relevant part of the configuration data from the database 305. In order to maintain and ensure consistency between the database 305 and the network element, the processing system 314 can be adapted to control the data transfer interface 313 to transmit periodically update requests to the part 312 of the software-defined network, where each update request requests to send at least the changes of the part of the configuration data related to the network element. Instead of receiving the above-mentioned notice of change and transmitting the above-mentioned query in response to the reception of the notice of change, the periodically transmitted update requests may be the only queries for configuration data. In this exemplifying case, the network element 301 and the database 205 are kept congruent by polling.

A network element according to an exemplifying embodiment of the invention comprises functional entities, e.g. software and/or hardware modules, each having an entity-specific portion of the configuration system. In this case the above-mentioned query can be specific to one or more of the functional entities and the specified part of the configuration data can be related to the one or more of the functional entities.

In a network element according to an exemplifying embodiment of the invention, the processing system 314 is adapted to control the data transfer interface 313 to transmit, to the part 312 of the software-defined network, an ability indicator to be written to the database. The ability indicator expresses one or more data formats suitable for the network element so as to enable a controller system of the software-defined network to get aware of the one or more data formats.

In a network element according to an exemplifying embodiment of the invention, the processing system 314 is adapted to control the data transfer interface 313 to transmit, to the part 312 of the software-defined network, status data related to the network element and to be written to the database so as to enable the controller system of the software-defined network to get aware of the status data. The processing system 314 can be adapted to control the data transfer interface 313 to transmit the status data in a data format suitable for the controller system of the software-defined network, where the suitable data format can be known by the network element on the basis of information received from the part 312 of the software-defined network or the suitable data format can be otherwise known by the network element.

In a network element according to an exemplifying embodiment of the invention, the processing system 314 is adapted to:
check whether the received configuration information is suitable for the network element,
implement, in response to suitability of the received configuration information, the configuration information into the configuration system and control the data transfer interface 313 to transmit an acceptance notification to the part 312 of the software defined network, and
control, in response to unsuitability of the configuration information, the data transfer interface 313 to transmit a refusal notification to the part 312 of the software defined network.

The above-mentioned acceptance or refusal notification enables the controller system of the software-defined network to get aware of whether the configuration information has been implemented into the configuration system of the network element.

In a network element according to an exemplifying embodiment of the invention, the processing system 314 is adapted to:
check whether the received configuration information comprises a portion suitable for the network element, and whether the received configuration information comprises an unsuitable portion,
implement, in response to existence of the suitable portion, the suitable portion into the configuration system and control the data transfer interface 313 to transmit an acceptance notification identifying the suitable portion and addressed to the part 312 of the software defined network, and
control, in response to existence of the unsuitable portion, the data transfer interface 313 to transmit a refusal notification identifying the unsuitable portion and addressed to the part 312 of the software defined network.

The above-mentioned acceptance or refusal notification enables the controller system of the software-defined network to get aware of the suitable portion of the configuration information which has been implemented into the configuration system of the network element.

In a network element according to an exemplifying embodiment of the invention, the processing system 314 is adapted to:
check whether the received configuration information is suitable for the network element together with other configuration information received earlier, and
implement, in response to suitability of the received configuration information together with the earlier received other configuration information, the received configuration information together with the earlier received other configuration information into the configuration system and control the data transfer interface 313 to transmit an acceptance notification identifying both the received configuration information and the earlier received other configuration information and addressed to the part 312 of the software defined network.

The configuration information and the earlier received other configuration information may relate to e.g. a transaction that comprises a set of changes to be made to the configuration system of the network element so that the each change is valid to be implemented into the configuration system only after all the changes of the set have been checked to be suitable for the network element and so that, if any of the changes turns out to be unsuitable, the whole set of changes is deemed to be unsuitable. The above-mentioned acceptance notification enables the controller system of the software-defined network to get aware of the implementation of the set of changes into the configuration system of the network element.

In a network element according to an exemplifying embodiment of the invention, the processing system 314 is adapted to control the data transfer interface 313 to transmit, to the part 312 of the software-defined network, a first portion of data in a data format supported at least by the network element system and by the controller system, and to transmit a second portion of the data in another, different data format supported at least by the network element.

The processing system 314 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 4:
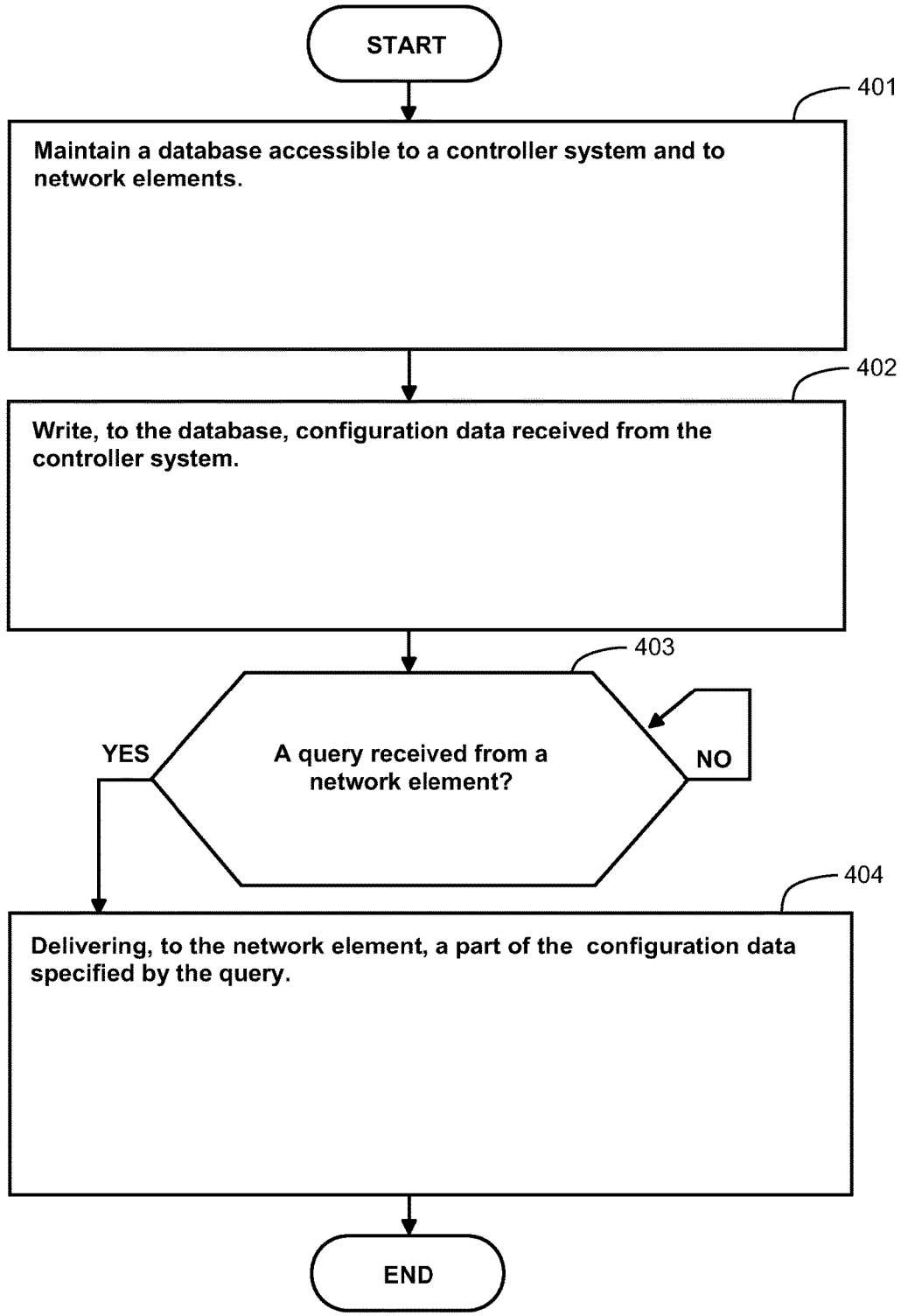
FIG. 4 shows a flow chart of a method according to an exemplifying embodiment of the invention for configuring network elements of a software-defined network.

FIG. 4 shows a flow chart of a method according to an exemplifying embodiment of the invention for configuring network elements of a software-defined network. The method comprises the following actions:

action 401: maintaining a database that is accessible to a controller system of the software-defined network and also to the network elements of the software-defined network, and action 402: writing, to the database, configuration data received from the controller system, The method comprises the following action in response to receiving 403, from one of the network elements, a query specifying a part of the configuration data:

action 404: delivering, to the one of the network elements, configuration information expressing the specified part of the configuration data so as to enable the one of the network elements to implement the configuration information at least partly into a configuration system enabling the one of the network elements to operate as a part of the software-defined network.

In a method according to an exemplifying embodiment of the invention, the one of the network elements is at least one of the following: an Internet Protocol IP router, a MultiProtocol Label Switching MPLS switch, a packet optical switch, an Ethernet switch.

A method according to an exemplifying embodiment of the invention comprises transmitting, to the one of the network elements, a change notice in response to a change in a portion of the configuration data related to the one of the network elements.

A method according to an exemplifying embodiment of the invention comprises writing, to the database, a first ability indicator received from the one of the network elements and expressing one or more first data formats suitable for the one of the network elements so as to enable the controller system to get aware of the one or more first data formats.

A method according to an exemplifying embodiment of the invention comprises writing, to the database, a second ability indicator received from the controller system and expressing one or more second data formats suitable for the controller system so as to enable the network elements to get aware of the one or more second data formats.

A method according to an exemplifying embodiment of the invention comprises writing, to the database, a first notification received from the one of the network elements and related to the delivered configuration information. The first notification enables the controller system to get aware of a portion of the delivered configuration information which has been implemented into the configuration system of the one of the network elements.

A method according to an exemplifying embodiment of the invention comprises writing, to the database, a second notification received from the one of the network elements and related to the delivered configuration information. The second notification enables the controller system to get aware of that the delivered configuration information has been implemented into the configuration system of the one of the network elements together with other configuration information delivered earlier to the one of the network elements.

A method according to an exemplifying embodiment of the invention comprises writing, to the database, status data received from the one of the network elements so as to enable the controller system to get aware of the status data. Advantageously, the status data is written to the database in a data format suitable for the controller system, where the suitable data format is expressed by data received from the controller system and written to the database.

A method according to an exemplifying embodiment of the invention comprises writing, to the database, a third notification received from the controller system.

The third notification enables the one of the network elements to get aware of whether the one of the network elements has been deemed, on the basis of the status data, to be suitable for operating as a part of the software defined network.

A method according to an exemplifying embodiment of the invention comprises writing, to the database, a first portion of data including the configuration data in a data format supported by the controller system and by such ones of the network elements using the first portion of the data, and writing a second portion of the data in another, different data format supported at least by the controller system. In a method according to an exemplifying embodiment of the invention, the one of the network elements comprises functional entities, e.g. software and/or hardware modules, each having an entity-specific portion of the configuration system, and the query is specific to one or more of the functional entities and the specified part of the configuration data is related to the one or more of the functional entities.

In a method according to an exemplifying embodiment of the invention, the database is maintained in a part of the software defined network accessible to the controller system via one or more data links of the software defined network.

A computer program according to an exemplifying embodiment of the invention comprises computer executable instructions for controlling a programmable processing system to carry out a method according to any of the above-described exemplifying embodiments of the invention.

A computer program according to an exemplifying embodiment of the invention comprises software modules for operating a network element of a software-defined network. The software modules comprise computer executable instructions for controlling a programmable processing system of the network element to:

control a data transfer interface of the network element to transmit a query to a part of the software-defined network maintaining a database accessible to many network elements of the software defined network and storing configuration data related to the network elements of the software defined network, the query specifying a part of the configuration data and requesting to send, to the network element, configuration information expressing the specified part of the configuration data, and implement, in response to receiving the configuration information, the received configuration information at least partly into a configuration system enabling the network element to operate as a part of the software-defined network.

A computer program according to an exemplifying embodiment of the invention comprises software modules for operating a controller of a software-defined network. The software modules comprise computer executable instructions for controlling a programmable processing system of the controller to deliver configuration data of many network elements of the software defined network to a database that is accessible to the controller and also to the network elements.

A computer program according to an exemplifying embodiment of the invention comprises the above-mentioned software modules for operating the network element of the software-defined network and the above-mentioned software modules for operating the controller of the software-defined network.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising:
    a data transfer interface that transmits data to the software-defined network and receives data from the software-defined network in accordance with a data plane of the software-defined network, and
    a processing system that maintains a configuration system enabling the network element to operate as a part of the software-defined network, and operates the network element in accordance with the configuration system, the configuration system comprising a system of interconnected look-up tables defining actions to be carried out by the network element when operating as the part of the software-defined network,
    wherein the processing system is adapted to:
        control the data transfer interface to transmit, to a part of the software-defined network maintaining a database accessible to plural network elements of the software-defined network and storing configuration data related to the network elements of the software-defined network, an ability indicator to be written to the database and expressing one or more data formats suitable for the network element so as to enable a controller system of the software-defined network to get aware of the one or more data formats,
        control the data transfer interface to transmit a query to the part of the software-defined network, the query specifying a part of the configuration data and requesting to send, to the network element, configuration information expressing the specified part of the configuration data, and
        update the configuration system in accordance with a control plane of the software-defined network by implementing, in response to receiving the configuration information, the received configuration information at least partly into the configuration system while the network element is operating as the part of the software-defined network in accordance with the configuration system.

2. The network element according to claim 1, wherein the processing system is adapted to control the data transfer interface to transmit the query in response to receiving, from the part of the software-defined network, a notice of change of the configuration data.

3. The network element according to claim 2, wherein the processing system is adapted to control the data transfer interface to transmit periodically update requests to the part of the software-defined network, each update request requesting to send at least changes of a portion of the configuration data related to the network element.

4. The network element according to claim 1, wherein the processing system is adapted to control the data transfer interface to transmit periodically update requests to the part of the software-defined network, each update request requesting to send at least changes of a portion of the configuration data related to the network element.

5. The network element according to claim 4, wherein the query is one of the update requests.

6. The network element according to claim 1, wherein the processing system is adapted to control the data transfer interface to transmit, to the part of the software-defined network, status data related to the network element and to be written to the database so as to enable a controller system of the software-defined network to get aware of the status data.

7. The network element according to claim 6, wherein the processing system is adapted to control the data transfer interface to transmit the status data in a data format suitable for the controller system of the software-defined network, the data format being expressed by data received from the part of the software-defined network.

8. The network element according to claim 1, wherein the processing system is adapted to:
    check whether the received configuration information is suitable for the network element,
    implement, in response to suitability of the received configuration information, the configuration information into the configuration system and control the data transfer interface to transmit an acceptance notification to the part of the software defined network, and
    control, in response to unsuitability of the configuration information, the data transfer interface to transmit a refusal notification to the part of the software defined network.

9. The network element according to claim 1, wherein the processing system is adapted to:
    check whether the received configuration information comprises a suitable portion suitable for the network element, and whether the received configuration information comprises an unsuitable portion,
    implement, in response to existence of the suitable portion, the suitable portion into the configuration system and control the data transfer interface to transmit an acceptance notification identifying the suitable portion and addressed to the part of the software defined network, and
    control, in response to existence of the unsuitable portion, the data transfer interface to transmit a refusal notification identifying the unsuitable portion and addressed to the part of the software defined network.

10. The network element according to claim 1, wherein the processing system is adapted to:
    check whether the received configuration information is suitable for the network element together with other configuration information received earlier, and
    implement, in response to suitability of the received configuration information together with the earlier received other configuration information, the received configuration information together with the earlier received other configuration information into the configuration system and control the data transfer interface to transmit an acceptance notification identifying both the received configuration information and the earlier received other configuration information and addressed to the part of the software defined network.

11. The network element according to claim 1, wherein the network element comprises functional entities each having an entity-specific portion of the configuration system, and the query is specific to one or more of the functional entities and the specified part of the configuration data is related to the one or more of the functional entities.

12. The network element according to claim 1, wherein the network element is at least one of the following: an Internet Protocol IP router, a MultiProtocol Label Switching MPLS switch, a packet optical switch, and an Ethernet switch.

13. A controller for configuring network elements of a software-defined network, the controller comprising:
- a data transfer interface that transmits data to the software-defined network and receives data from the software-defined network, and
- a processing system that determines and updates, in accordance with a control plane of the software-defined network, configuration data enabling the network elements to operate as parts of the software-defined network in accordance with a data plane of the software-defined network, the configuration data enabling each of the network elements to maintain a configuration system comprising a system of interconnected look-up tables defining actions to be carried out by the network element when operating as the part of the software-defined network,
- wherein the processing system is adapted to:
  - deliver, via the software-defined network, the configuration data and at least updates of the configuration data to be written to a database accessible to the network elements to be configured, and
  - deliver, via the software-defined network, an ability indicator to be written to the database and expressing one or more data formats suitable for the controller so as to enable the network elements to get aware of the one or more data formats.

14. The controller according to claim 13, wherein the processing system is adapted to retrieve, from the database, status data delivered to the database by one or more of the network elements.

15. The controller according to claim 14, wherein the processing system is adapted to:
- check whether the status data expresses suitability of the one or more of the network elements for operating as a part of the software defined network,
- deliver, in response to the suitability of the one or more of the network elements, an acceptance notification to the database, and
- deliver, in response to unsuitability of the one or more of the network elements, a refusal notification to the database.

16. The controller according to claim 13, wherein the processing system is adapted to deliver, to the database, a first portion of data including the configuration data in a first data format supported by the controller and by such ones of the network elements using the first portion of the data, and a second portion of the data in a second data format different from the first data format and supported at least by the controller.

17. The controller according to claim 13, wherein the processing system is adapted to control the data transfer interface to transmit the configuration data to a part of the software-defined network maintaining the database so as to deliver the configuration data to the database.

18. The controller according to claim 17, wherein the processing system is adapted to control, in response to a need to retrieve data from the database, the data transfer interface to transmit, to the part of the software-defined network, a query specifying the data to be retrieved and requesting to send the specified data to the controller.

19. A method for configuring network elements of a software-defined network, the method comprising:
- maintaining a database that is accessible to a controller system of the software-defined network and to the network elements of the software-defined network,
- writing, to the database, configuration data and at least updates of the configuration data received from the controller system via the software-defined network, the configuration data enabling the network elements to operate as parts of the software-defined network in accordance with a data plane of the software-defined network, and
- writing, to the database, an ability indicator received from one of the network elements via the software-defined network and expressing one or more data formats suitable for the one of the network elements so as to enable the controller system of the software-defined network to get aware of the one or more data formats,
- wherein the method comprises the following action in response to receiving, from the one of the network elements, a query specifying a part of the configuration data:
  - delivering, to the one of the network elements, configuration information expressing the specified part of the configuration data so as to enable the one of the network elements to update, in accordance with a control plane of the software-defined network, a configuration system enabling the one of the network elements to operate as a part of the software-defined network in accordance with the data plane of the software-defined network by implementing the configuration information at least partly into the configuration system enabling the one of the network elements to operate as the part of the software-defined network, the configuration system comprising a system of interconnected look-up tables defining actions to be carried out by the one of the network elements when operating as the part of the software-defined network.

20. A non-transitory computer readable medium encoded with a computer program comprising computer executable instructions for controlling a programmable processing system of a network element of a software-defined network to:
- control a data transfer interface of the network element to transmit, to a part of the software-defined network maintaining a database accessible to plural network elements of the software defined network and storing configuration data related to the network elements of the software-defined network, an ability indicator to be written to the database and expressing one or more data formats suitable for the network element so as to enable a controller system of the software-defined network to get aware of the one or more data formats,
- control the data transfer interface of the network element to transmit a query to the part of the software-defined network, the query specifying a part of the configuration data and requesting to send, to the network element, configuration information expressing the specified part of the configuration data, and
- update a configuration system of the network element in accordance with a control plane of the software-defined network by implementing, in response to receiving the configuration information, the received configuration information at least partly into the configuration system while the network element is operating as a part of the software-defined network in accordance with the configuration system, the configuration system comprising a system of interconnected look-up tables defining actions to be carried out by the network element when operating as the part of the software-defined network in accordance with a data plane of the software-defined network.

21. The non-transitory computer readable medium according to claim 20, wherein the computer program further comprises computer executable instructions for controlling a programmable processing system of a controller of the software-defined network to deliver the configuration data to the database.

\* \* \* \* \*